June 11, 1935. J. ECKHARD 2,004,750

CLUTCH DEVICE FOR VARIABLE SPEED TRANSMISSION MECHANISM

Filed Dec. 29, 1931 3 Sheets-Sheet 1

INVENTOR.
John Eckhard
BY
ATTORNEY.

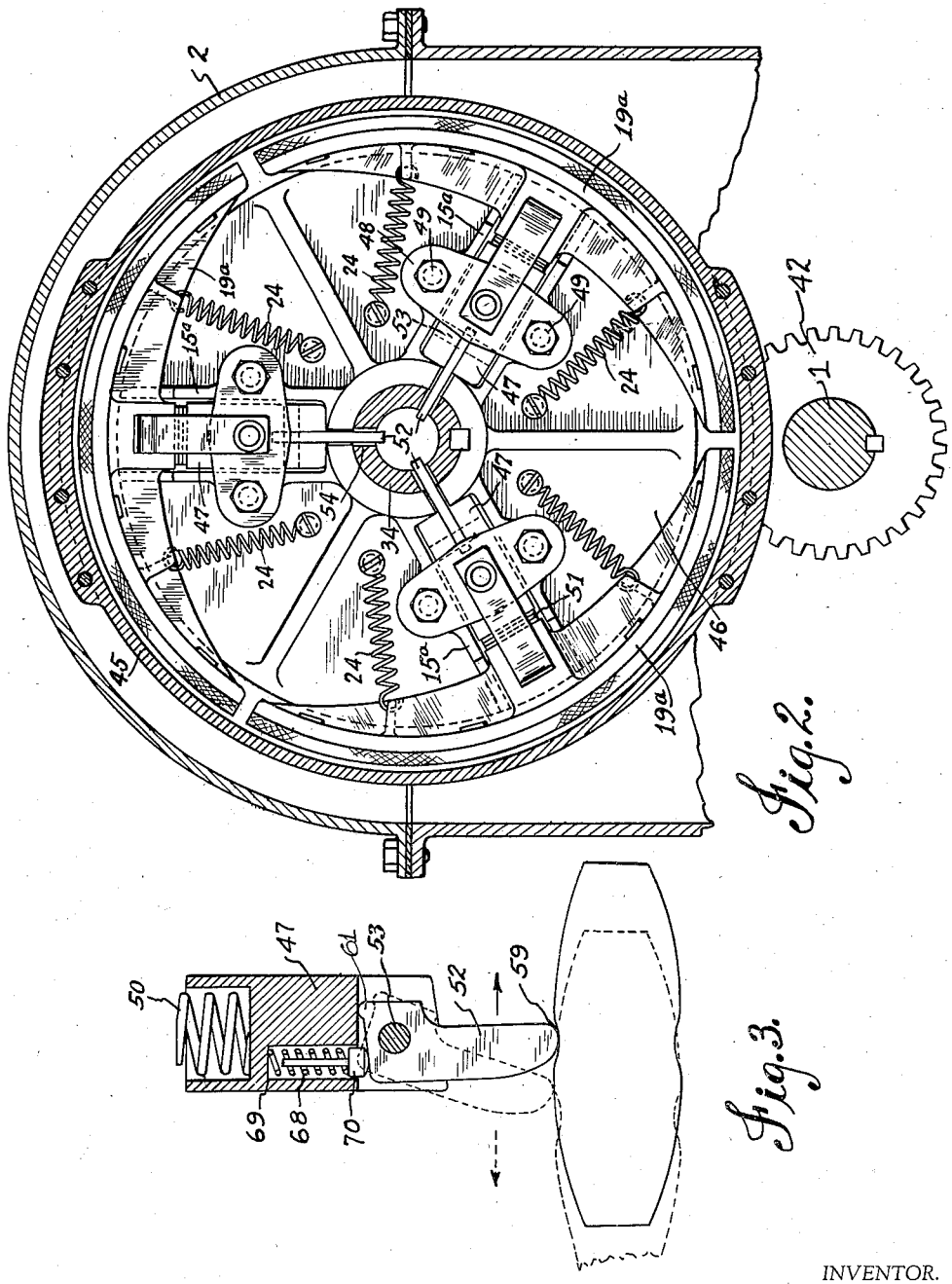

Patented June 11, 1935

2,004,750

UNITED STATES PATENT OFFICE 2,004,750

CLUTCH DEVICE FOR VARIABLE SPEED TRANSMISSION MECHANISM

John Eckhard, Cincinnati, Ohio

Application December 29, 1931, Serial No. 583,721

7 Claims. (Cl. 192—76)

My invention relates to variable speed transmission mechanism particularly for automotive vehicles in which a change of speed is effected by the simple, straight-line movement of a tapered actuator within a tubular jack shaft thereby avoiding the cumbersome external construction heretofore required for actuating the clutches of transmission mechanism operable on the same general principle.

It is my object to provide a transmission in which the clutches for actuating various speed changes are self-adjusting to compensate for wear on the clutching surfaces of the clutches.

Another object is the provision of clutches for actuating the different gears in which the shoes carrying the clutching surfaces may readily be interchanged without the use of different tools and in fact in which the shoes may be replaced without any tools being required.

The above objects in their broadest aspects as stated above, and other objects which will be noted in the course of the following description are illustrated in the accompanying drawings, in which:—

Figure 2 is a partial vertical cross section on the plane of the line 2—2 of Figure 1.

Figure 3 is a detail of one of the clutch shoe blocks and the cam finger therein, together with a diagrammatic representation of the actuator showing by solid lines the positions of the actuator and finger when the actuator is moving in the direction of the solid arrow to make the clutch operative, and showing by dotted lines the change in position of the finger as the actuator passes in the direction of the dotted arrow without rendering the clutch operative.

Figure 1:
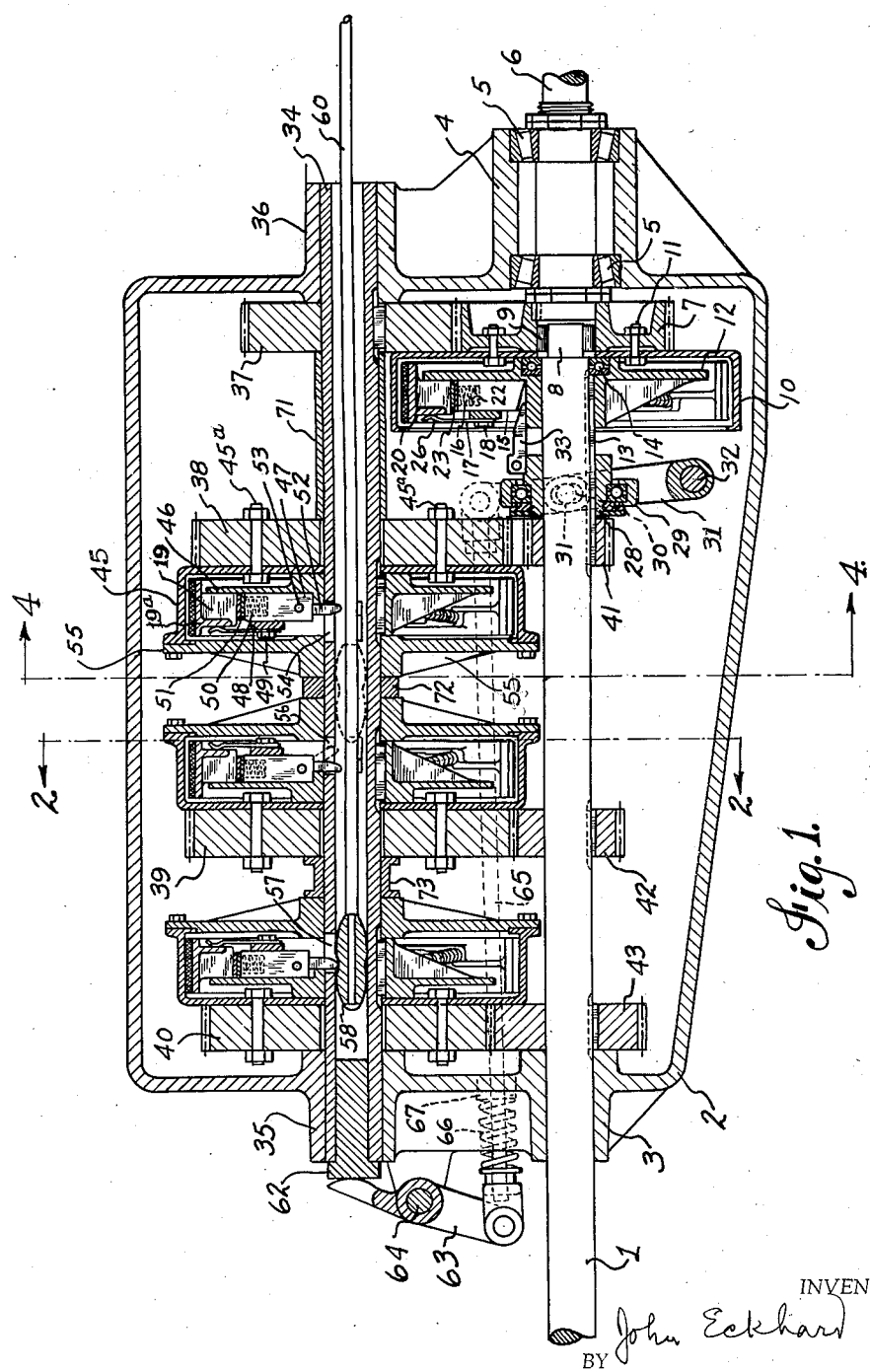
Figure 1 is a longitudinal vertical section on the plane of the line 1—1 of Fig. 4.
Figure 4:
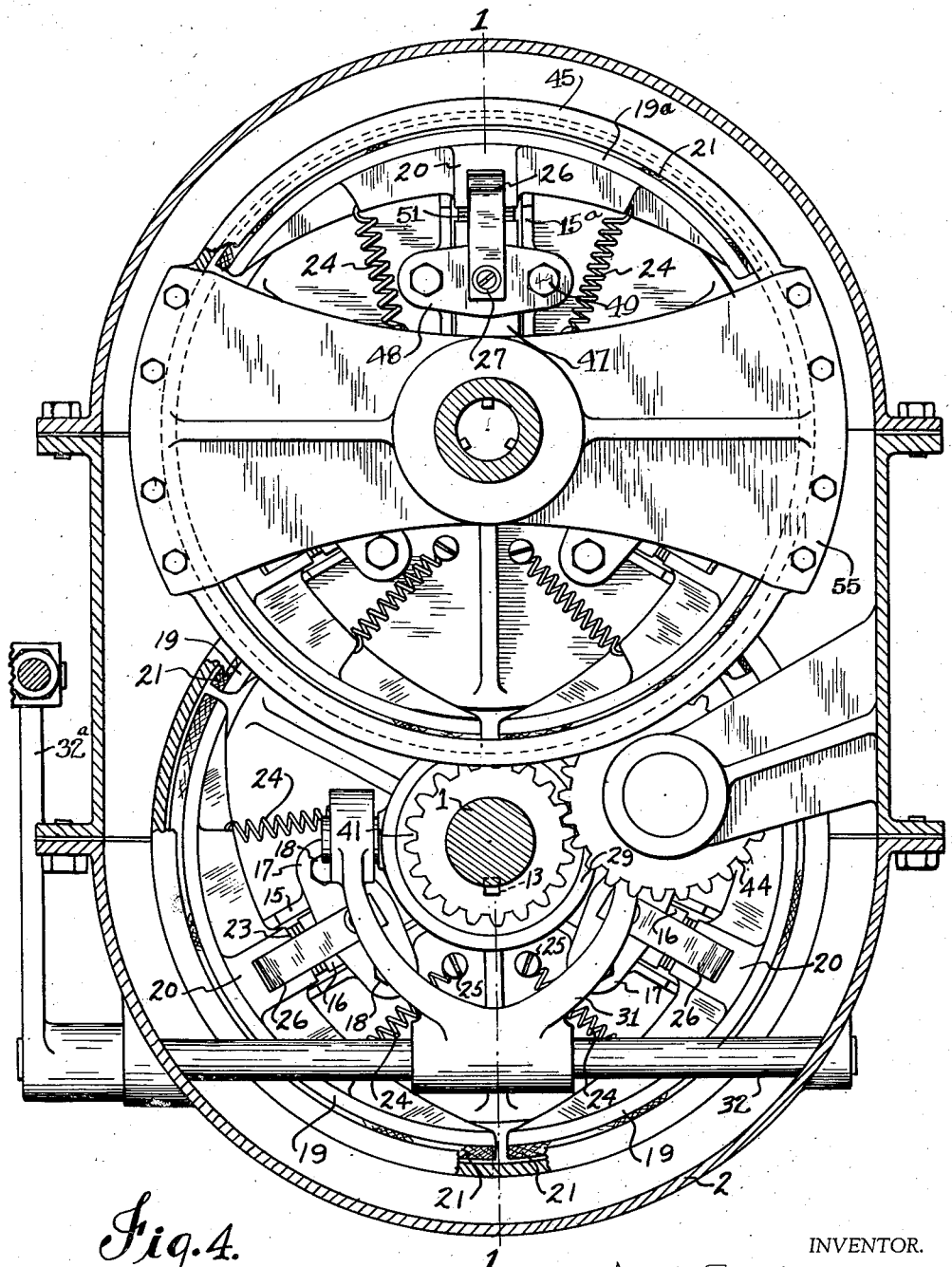

Figure 4 is a vertical cross section on the plane of the line 4—4 of Figure 1.

In the preferred embodiment of my invention, as illustrated in these drawings, the driving shaft 1 will be understood to be the shaft that is connected to the engine or motor of the vehicle, and the casing 2 has the bearing 3 at its front end for this shaft. At the rear end of the casing 2 is the hollow boss 4 containing the roller bearings 5 for the shaft 6, which is understood to be connected by suitable universal couplings and a connecting shaft to the differential mechanism for the driving wheels of the vehicle. This shaft 6 projects forwardly of the front roller bearings 5, and has keyed on it the spur gear 7. The driving shaft 1 has its rear end part 8 reduced in diameter, and the shaft 6 extends only part way through the hub of the gear 7, leaving space wherein this reduced part 8 is journaled by roller bearings 9.

The direct driving clutch shell 10 is bolted to the gear 7 by bolts 11. Inside this shell, the carrier 12 is keyed on the driving shaft 1 by the spline 13. The rear end of the hub of this carrier 12 has an annular recess around the shaft 1 containing end thrust bearings 14. The carrier 12 has equally spaced around it radial channel guides 15, which have their inner ends at right angles to their length, and have guided in them respective blocks 16, held therein by small yokes 17 secured across the channel guide 15 by cap screws 18. The inner end of each block diverges somewhat from the end of the guide. The segmental shoes 19 have square hubs 20 fitting in the outer end parts of the respective guides 15, and have suitable facings 21 to contact with the inner surface of the shell 10 when pushed outward by the respective blocks 16. To make the clutches self-compensating for wear, each block 16 has a recess containing a strong helical spring 22, and between this and the shoe hub 20, shims 23 are placed. The purpose of the springs 22 is not only to take up or compensate for wear of the clutching surfaces, but also to maintain the clutch at a desired tightness of clutching. Each clutch shoe 19 is connected by two springs 24, one at each side of the guide 15, to screws 25 in the wall of the clutch carrier 12, which springs thus hold the clutch shoe inward against the shims 23. To prevent the clutch shoe 19 from slipping through the open end of the shell 10, a tongue 26 is held on each small yoke 17 by a screw 27 and extends out and bears resiliently against a boss of the shoe. The tongue 26 may be swung aside on its screw 27 for removal and replacement of the shoe without the use of tools.

Forwardly from this clutch mechanism just described, a hub 28 slides on the spline 13 and turns in a ring 29, having ball bearings. The ring has lateral trunnions 30 embraced by the respective members of a fork 31 fixed on the transverse shaft 32 below the hub 28. Wedges 33 are pinned on this hub 28, and project therefrom between the hub of the carrier 12 and the inner ends of the respective blocks 16. This shaft 32 extends out through one side of the casing 2, and has fixed on it the lever arm 32a.

The parallel or jack shaft 34 is journaled in the front bearing 35, and the rear bearing 36 in the casing 2 and is tubular. It has keyed on it and meshing with the gear 7 of the driven shaft 6, the spur gear 37. Also it has loose and free to turn relatively to it, the three gears 38, 39 and 40. The drive shaft 1 has keyed on it the three gears 41, 42 and 43, the latter two meshing with the gears 39 and 40, respectively, while the gear 41 meshes with an idler gear 44, which meshes with the gear 38. This gear 38 has the clutch shell 45 secured to its front face by bolts 45a. The clutch carrier 46 is keyed on the shaft 34 inside this shell, with three channel guides 15a equally spaced around it, which support and guide the clutch shoes 19a and blocks 47 held by yokes 48 and screws 49; the block 47 containing the spring 22, with washers or shims 51 between it and the shoe 19a. The clutch is in these respects the same as the direct driving clutch above described. The block 47, however, has a finger 52 pivoted in a crotch in its lower end on a pin 53 and extending inside the tubular shaft 34 through a slot 54 in the shaft. Also there is a yoke 55 embracing the shaft 34 and bolted to diametrically opposite parts of the rim of the shell 45, thus giving the shell a more extended support on the shaft 34.

The other two gears 39 and 40 have clutch mechanisms the same as just described for the gear 38, but have these mechanisms bolted onto their rear faces. The parts of these clutch mechanisms therefore are numbered the same as those of the clutch mechanism of the gear 38, and the cam fingers 52 of these mechanisms extend into the interior of the shaft 34 through slots 56 and 57, respectively. The actuator 58 has a middle part that fits slidingly in the interior of the shaft 34 and is shaped with a taper toward both ends from this middle part, and has around this middle part a circumferential shallow groove 59. The actuator has an opening through it from end to end in which fits the reduced end part of the operating rod 60, which extends out past the rear end of the tubular shaft 34 for connection to suitable manipulating mechanism on the vehicle.

Each finger 52 engages the end of the slot in the shaft 34, limiting its swinging in one direction so that the finger is held in relation to the block 47 as a thrust element by means of which the actuator 58 wedges the block radially outward until the actuator groove 59 receives the end of the finger. The finger is free to swing in the shaft slot in the other direction, allowing passage of the actuator 58, without wedging the finger and block 47 outward. This makes it unnecessary to clutch for an intermediate speed when changing from a speed higher to a speed lower than the intermediate speed. A nose 61 on the finger 52 engages the crotch of the block 47 to hold the finger in its extended position for entrance to the shaft slot when assembling the mechanism on the shaft 34.

In the front end of the tubular shaft 34 a bushing 62 is slidably mounted. A lever 63 has a transverse fulcrum 64 on the front end of the casing 2 and extends upward into contact with the bushing 62 and extends downward and has pivoted to it one end of a rod 65, which extends backward and has its front end pivoted to the upper end of the lever 32a, which operates the direct driving clutch. A helical spring 66 is compressed between the front connecting head of this rod 65 and a lug 67 on the side of the casing 2 and holds the rod yieldingly forward, with the wedges 33 withdrawn from under the blocks 16. In operating the device, if the actuator 58 is moved to its extreme forward position, it presses the bushing 62 outward, which acts through the operative connections just described to move the wedges 33 under the blocks 16, pressing these blocks radially outward and clamping the shoes 19 against the inside of the shell 10; thus connecting the shafts 1 and 6 together for direct transmission, which affords the highest speed.

When the actuator 58 is drawn backward, its rear end part pushes the fingers 52 of the forwardmost part of gears 40 and 43 backward without operating the clutch; and upon reaching the fingers 52 of the clutch for the gear 39 the same action occurs without operating the clutch of this gear 39. Upon reaching the rearmost position, however, the actuator 58 engages the fingers 52 of the clutch of the rearmost one of the three gears by wedging radially outward on these fingers, which rest and slide against the rear ends of the slots 54 in the tubular shaft 34. This wedges the blocks 47 radially outward, clamping the shoes 19a of this clutch against the inside of the shell 45. The result will be that the gear 38, which is being turned loosely on the tubular shaft 34 by means of the idler gear 44 meshing with the gear 41 fixed on the driving shaft 1, will be coupled to the tubular shaft 34, which will be rotated in the same direction as the driving shaft 1, and will impart a reverse motion to the shaft 6 by means of the meshing gears 7 and 37. This will be the reverse drive for the motor vehicle.

Moving the actuator 58 forward, it will encounter the fingers 52 of the clutch of the middle pair of gears 39 and 42 and will wedge outward on these fingers, causing this clutch to connect the gear 39 to the tubular shaft 34, which gear is being driven by the gear 42 fixed on the driving shaft 1. This will drive the tubular shaft 34 in direction reverse to that of the driving shaft 1, and will drive the shaft 6 by means of the gears 37 and 7 in the same direction as the driving shaft 1.

Upon moving the actuator 58 farther forward, it will act in the same way on the fingers 52 of the clutch of the gears 40 and 43, so that the drive of the shaft will be from the driving shaft 1 through the gears 43 and 40, the tubular shaft 34 and the gears 37 and 7 in the same direction as that derived from the middle set of gears, but at a different speed. The groove 59 around the actuator 58 allows the block 47 to slip radially inward slightly but still holding the clutch shoes 19a in driving contact with the shell 45. By this engagement in this groove 59, the finger 52 is prevented from swinging away from its sustaining position under the influence of vibration of the mechanism. As clearly shown in Figure 3, a small spring 68 contained in a recess 69 in the block 47 presses a small plunger 70 against a part of the top of the finger 52, which is horizontally disposed from the pivot pin 53 sufficiently to permit this small spring 68 normally to hold the finger 52 against the end of the shaft slot 54, 56, or 57, as the case may be, ready for the clutch-operating, wedging action of the actuator 58, as above described. However, this spring 68 allows the finger 52 to yield upwardly as indicated by the dotted lines in Figure 3, so that the actuator 58 may pass thereunder in one direction without operating the clutch as before described.

It will be seen from the foregoing description that with the rearmost position of the actuator 58 the vehicle will be driven backward; and that as the actuator 58 is pushed forward, successively higher speeds will be afforded. As the gears 39 and 40 are successively clutched to the tubular shaft 34, then the driving shaft and shaft 6 are directly connected by the operation through the bushing 62 at the forwardmost position of the actuator 58.

Direct connection of the driving shaft 1 and shaft 6 is used to avoid imposing the load on two such rapidly rotating gears as the gears 7 and 37 would have to be in order to attain this high speed alone through the tubular shaft in the way that the lower speeds are attained. Of course in this direct drive the gear 7 rotates the gear 37, which rotates the tubular shaft 34, but as there is no load on these parts this is not objectionable. The result to be avoided is the loud noise which is made by such rapidly running, heavily loaded gears.

The gears 37 and 38 are spaced apart by a thin sleeve 71 around the shaft 34, and a collar 72 around this shaft spaces the inversely disposed clutch mechanisms of the gears 38 and 39 apart, while another collar 73 spaces the gear 39 from the clutch mechanism of the gear 40. The gear 40 and gear 37 bear axially against the bearings 35 and 36, respectively, of the casing 2. Thus the loosely mounted gears and their clutch mechanisms are prevented from having end play, and are maintained in mesh with the respective gears 41, 42 and 43.

The mechanism thus will be seen to be comparatively simple and compact, and has the especial advantage of being operated by various simple and easily understood manipulations of the single actuator 58, without the necessity of a special clutching mechanism since the throwing into operation of any particular pair of transmission elements is effected by a clutching operation.

During positions between engagement of the member 58 and the fingers 52, there is always a condition of neutrality.

I have set forth a preferred example of my invention rather specifically, but it will be understood that the invention is capable of considerable modification to meet conditions in practice without departing from the scope and spirit thereof, and that therefore I am not limited to such precise disclosure, but what I claim as new and desire to secure by Letters Patent, is:—

1. A clutch for clutching together a shaft and an element rotatable on the shaft, comprising a shell connected to the element, a carrier connected to the shaft and having radial guides, shoes guided by the guides to and from the interior of the shell, means movable on the shaft, means to transmit movement of said means to the shoes for pressing the shoes to the shell, and means holding the shoes to the guides, movable by the hands without the use of tools, to permit removal of the shoes from the guides.

2. A clutch for clutching together a shaft and an element rotatable on the shaft, comprising a shell connected to the element, a carrier connected to the shaft and having radial guides, shoes guided by the guides to and from the interior of the shell, blocks guided by the guides to move the shoes, means movable on the shaft to impart movement to the blocks, yokes removably secured to the carrier to hold the blocks to the guides, and means holding the shoes to the guides, movably mounted on the yokes and movable by the hands without the use of tools, to permit removal of the shoes from the guides.

3. A clutch for clutching together a shaft and an element rotatable on the shaft, comprising a shell connected to the element, a carrier connected to the shaft and having radial guide channels, shoes presented toward the interior of the shell and having extensions sliding in said guides, blocks slidable in said guides to move the shoes toward the shell, means movable on the shaft to impart movement to the blocks, yokes secured across the guides and holding the blocks in the guides, and resilient tongues pivoted on said yokes, holding the shoes in the guides and adapted to be swung on their pivots away from the shoes to permit removal of the shoes.

4. A clutch for clutching together a shaft and an element rotatable on the shaft, comprising a shell connected to the element, a carrier connected to the shaft and having radial guide channels, shoes presented toward the interior of the shell and having extensions sliding in said guides, blocks slidable in said guides, springs compressed between the blocks and the shoe extensions, springs stretched from the shoes to the carrier in opposition to and weaker than the compressed springs, yokes secured across the guides and holding the blocks in the guides, resilient tongues pivoted on the yokes, holding the shoes in the guides and adapted to be swung on their pivots away from the shoes to permit removal of the shoes, and means movable on the shaft to move the blocks and thereby move the shoes to the shell.

5. A clutch for clutching together a hollow shaft having slots in its wall and an element rotatable on the shaft, comprising a shell connected to the element, a carrier connected to the shaft and having radial guides, shoes guided by the guides to contact with the interior of the shell, blocks guided by the guides, fingers pivoted in the blocks and extending into the shaft slots for engagement by an actuator movable inside the shaft, and adapted to engage ends of the slots to maintain a thrust relation to the blocks for outward wedging thereof toward the shoes by the actuator moving in one direction, but yielding away from the slot ends when engaged by the actuator moving in the opposite direction.

6. A clutch comprising a clutch member operated for clutching together a shaft having a device movable therein, and an element rotatable on the shaft, by means of mechanism actuated by said device, in which the mechanism comprises resilient means by which it transmits the clutching pressure from said device to the clutch surfaces, and a shim to adjust said resilient means, and in which the device actuates the mechanism by members comprised in the device and the mechanism, respectively, by engagement when the device is moved to the element in one direction, and in which said members are relatively yielding, without actuation of the mechanism, when the device is moved to the element in the other direction.

7. A clutch comprising a clutch member operated for clutching together a shaft having a device movable therein, and an element rotatable on the shaft, by means of mechanism actuated by said device, in which the mechanism comprises resilient means by which it transmits the clutching pressure from said device to the clutch surfaces, and a shim to adjust said resilient means, and in which the device actuates the mechanism by members comprised in the device and the mechanism, respectively, by engagement when the device is moved to the element in one direction, and in which the members are relatively yielding, without actuation of the mechanism, when the device is moved to the element in the other direction, and in which the relatively yielding members have mutually engaging surfaces preventing the relative yielding, to maintain the clutching relation, the mutual engagement of said surfaces being maintained by the resilient means, which permits the surfaces to separate when the device is moved away from the element.

JOHN ECKHARD.